United States Patent

Markowitz et al.

[15] 3,668,496

[45] June 6, 1972

[54] SINGLE REVOLUTION CRANK SYSTEM

[72] Inventors: Ivan N. Markowitz, Framingham; Robert G. Bower, Concord, both of Mass.

[73] Assignee: Honeywell Information Systems Inc., Waltham, Mass.

[22] Filed: Dec. 4, 1970

[21] Appl. No.: 95,182

[52] U.S. Cl. ............................318/466, 318/468, 318/626

[51] Int. Cl. ..................................................G05g 5/00

[58] Field of Search..................318/466, 468, 470, 618, 626, 318/627, 275

[56] References Cited

UNITED STATES PATENTS

| | | | |
|---|---|---|---|
| 3,241,015 | 3/1966 | Allen | 318/615 |
| 3,582,739 | 6/1971 | Daab | 318/467 |
| 3,564,376 | 2/1971 | Mais et al. | 318/466 |
| 3,508,133 | 4/1970 | Schneider et al. | 318/466 X |
| 3,564,367 | 9/1968 | Wanner et al | 318/466 X |

*Primary Examiner*—Benjamin Dobeck
*Attorney*—Ronald T. Reiling and Fred Jacob

[57] ABSTRACT

A single revolution crank system is provided for a DC motor, having a Hall effect sensing device employed as a position sensor. A bar magnet is attached to the DC motor shaft, with a magnetic Hall electrode device in the form of a Hall chip disposed adjacent the path of the bar magnet during its rotation on the shaft. A servo control loop is provided between the Hall effect device and the motor which is effective to substantially apply a constant voltage to the motor while the bar magnet has its one pole remotely disposed from the device, and with the one pole rotated to a position adjacent to the Hall effect device, an EMF is generated which is effective to reset a servo control flip-flop in the system to bring the motor velocity to zero. A mechanical detent is provided in the system to maintain the motor in the zero velocity position.

8 Claims, 5 Drawing Figures

INVENTORS
Ivan N. Markowitz
Robert G. Bower

BY [signature]
ATTORNEY

INVENTORS
Ivan N. Markowitz
Robert G. Bower
BY [signature]
ATTORNEY

INVENTORS
Ivan N. Markowitz
Robert G. Bower
BY [signature]
ATTORNEY

SINGLE REVOLUTION CRANK SYSTEM

BACKGROUND OF THE INVENTION

In the co-pending application of Bower et al., Ser. No. 76,413 filed Sept. 29, 1970 and assigned to Honeywell Information Systems Inc., there is provided a card feeding apparatus effective in translating a single card from a stack of cards to a wait station, and then to a card reading device. In the above disclosed device a plurality of flexure members support a picker and pusher mechanism which operate on a card in transverse directions to move a card from the wait station to the card reader and to transfer a new card from the stack into the wait station. The problem of operating on the cards with a transverse motion is solved by utilizing an eccentric coupling which is fully disclosed in that application. However, in the operation of the proposed eccentric coupling a requirement still exists for a device to impart a single revolution to the shaft upon which the eccentric is coupled. Such device should be capable of operating the eccentric coupling, and hence the pick and push devices with substantially a constant velocity throughout the single revolution. This requirement, when satisfied, ensures that card edges are not damaged by impact of mechanical elements or being forced between feed rolls.

While the invention is shown in conjunction with the above cited card reader feed mechanism, it will become apparent to those skilled in the art that there are many similar applications wherein it is desirable to operate a mechanism by the single revolution of a motor coupled to the mechanism and wherein initiation and stopping the operation must be done in a precise manner.

Heretofore there have been provided known mechanical clutches which employ a plurality of moving parts to provide for single revolution, or rotation, of a shaft operated by a standard DC motor drive. Such single revolution clutches as they are sometimes known are complex in nature, and are subject to wear; in many instances these devices have proven unreliable after a great many cycles of the drive. It is therefore an object of the present invention to provide a single revolution device of the type described, which is simple and efficient in operation.

It is another object of the present invention to provide for the operation of a DC motor through a single revolution only, which operation is initiated at a precise command and stopped at a precise point at the end of the single revolution.

It is a further object of the invention to provide for the single motor revolution hereinbefore described by use of a servo control loop employing a Hall effect device.

SUMMARY OF THE INVENTION

The present invention provides a simple and inexpensive, yet highly reliable single revolution clutch wherein, a magnetic Hall effect sensing element is located adjacent a shaft of a DC servo motor. Suitable circuitry is provided in the form of a servo loop which adjusts the EMF to the motor. The motor is operated through the loop at a substantially constant velocity, which velocity is initiated and terminated by the Hall effect device. Additionally, the arrangement is provided with a magnetic detent which is effective to prevent the shaft's overriding the stop position and to hold the magnet in an unoperative position adjacent the Hall effect device.

BRIEF DESCRIPTION OF THE DRAWINGS

The aforementioned objects of the present invention, together with features and advantages thereof will become apparent from the following detailed description when read together with the accompanying drawings in which.

DESCRIPTION OF THE PREFERRED EMBODIMENT

Figure 1:
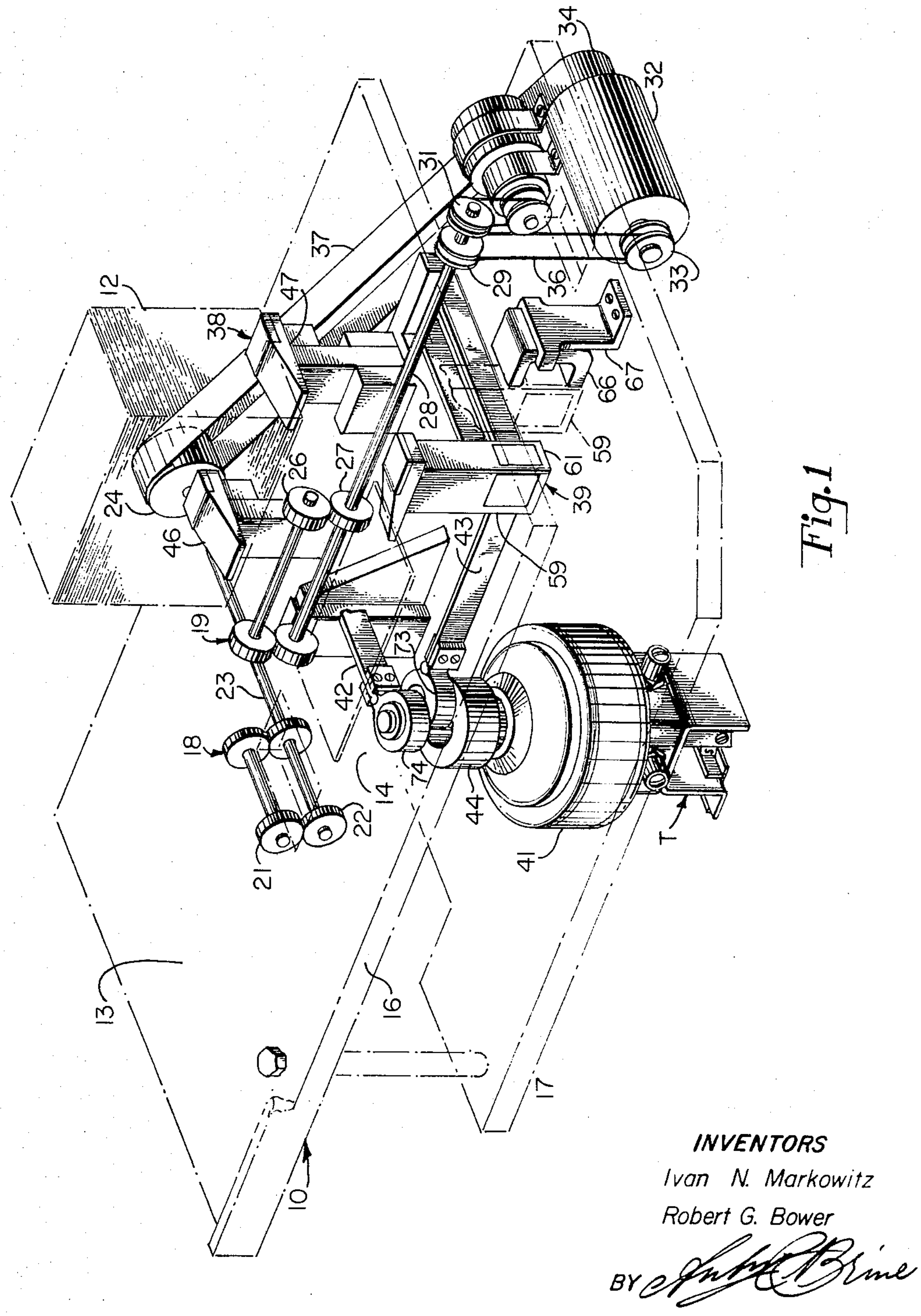
FIG. 1 is a perspective view showing a portion of a card reader for detecting information punched in each column on a card, in which card feeding apparatus is provided having an embodiment of the present invention employed therein.

Referring now to FIG. 1, there is shown a card feeding apparatus 10 in which the present invention has been advantageously employed. The apparatus 10 as shown contains essential elements for transferring cards singly from a hopper 12 along a prescribed path to a processing station designated as 13. Where the card feeding apparatus is employed in a card reader device, the card station 13 may comprise a read head of any type well known in the art. However, it should be understood that the card feeding apparatus 10 is not limited to card readers but may be employed in other card devices such as a card punch arrangement, in which the embodiment the various elements provided to perform the punching operation would be located at the processing station 13. For the purpose of the present description, station 13 is intended to be provided with a read head (not shown) and the apparatus 10 is employed in a card reader used in conjunction with a computer of any type well known in the art.

As best shown in FIG. 1, the cards in traveling from the hopper 12 to the operating station 13 are fed in transverse directions along a path which includes a "wait" station 14 which is open to the view of the operator of the device. At the wait station 14, the card may be read by the operator, at which time a card may be inserted manually to replace a card in a given program, or to provide additional information to a program stored in the hopper 12. As will be noted, the wait station 14 is unencumbered by pinch rollers or other feed mechanism, and the card may be removed at that point along its point of travel. The wait station 14 comprises the top surface of plate 16 which together with a second plate 17 serves to provide a portion of the support structure for the various elements of the card feeding apparatus 10.

Between the wait station 14 and the operating station 13 an opening is provided in the plate 16 and a pinch roll assembly 18 extends through the opening such that contacting surfaces of the pinch rolls are substantially in alignment with the top surface of plate 16.

At an adjacent side of the wait station 14, and aligned transversely with the pinch roll assembly 18 there is located another set of pinch rolls 19 which likewise have their contact surfaces disposed substantially in alignment with the top surface of the plate 16, and adjacent the bottom of the hopper 12.

The pinch roll assembly 18 comprises a pair of idler rolls 21 and a pair of drive rolls 22, the idler rolls generally being supported from the cabinet structure from springs (not shown), or biased toward the drive rolls 22 in a manner which is conventional in pinch roll structures of this type. As will be noted, drive rolls 22 are mounted on a shaft 23 connected to a drive pulley 24. In like fashion, the pinch roll assembly 19 comprises a pair of idler rolls 26 which are biased (by means not shown) toward a pair of drive rolls 27. The drive rolls 27 are attached to a shaft 28 on which is mounted a drive pulley 29 having an idler pulley 31 affixed at its opposite end. In the embodiment as shown, a single drive motor 32, which may be chosen from any number of AC or DC motors suitable for this purpose is attached to the bottom surface of the plate 17. The drive motor 32 has a pulley 33 attached to one end of the motor drive shaft and a pulley 34 attached to the opposite end of the motor drive shaft, allowing the motor to drive from either end of the shaft. The pulley 33 is connected to the drive pulley 29 and the idler pulley 31 by a belt 36, while the pulley 34 is drivingly engaged with the pulley 24 by means of a belt 37 connecting the two.

It will be observed that operation of the motor 32 is effective to simultaneously rotate the drive rolls 22 and the drive rolls 27 in a continuous fashion, so long as the motor remains energized.

In addition to the drive roll assemblies 18 and 19 as described above, the cards to be fed from the hopper 12 are operated on by a picker device 38 and a pusher device 39 which are effective to move a card along a prescribed path to the processing station 13. Both the picker mechanism 38 and the pusher mechanism 39 are connected to a DC motor 41 by flexure drive springs 42 and 43 respectively operating through an eccentric coupling 44 which is effective to drive the picker mechanism 38 and the pusher mechanism 39 in timed relation. Operation of these elements will be explained in greater detail as the description proceeds.

The picker mechanism 38 comprises a pair of picker knives 46 and 47 mounted in spaced relation with one another by means of flexural supports to provide for substantially linear movement of the picker knives. The knives 46 and 47 serve to support the stack of cards placed in the hopper 12 and during reciprocation a blade portion is disposed for contacting the bottom most card and is effective to move the card to a position between the rolls 26 and 27.

The pusher mechanism 39, generally, comprises a pusher arm 59 mounted on a block 61 which extends through an opening in the plate 16 for reciprocating motion into, and out of, the wait station 14. The block 61 is supported by a pair of flexure members for providing linear movement to the arm 59 during reciprocating motion of the block 61.

Referring still to FIG. 1, a detent means in the form of a permanent magnet 66 is attached to a bracket member 67 connected to the plate 17 in spaced relation, and in alignment, with, the arm 59. The permanent magnet 66 is designed to generate a magnetic flux of sufficient intensity to draw the arm 59 to a point adjacent the magnet, and thereby to detent the arm 59 in a position adjacent, and slightly spaced from, the magnet.

Figure 2:
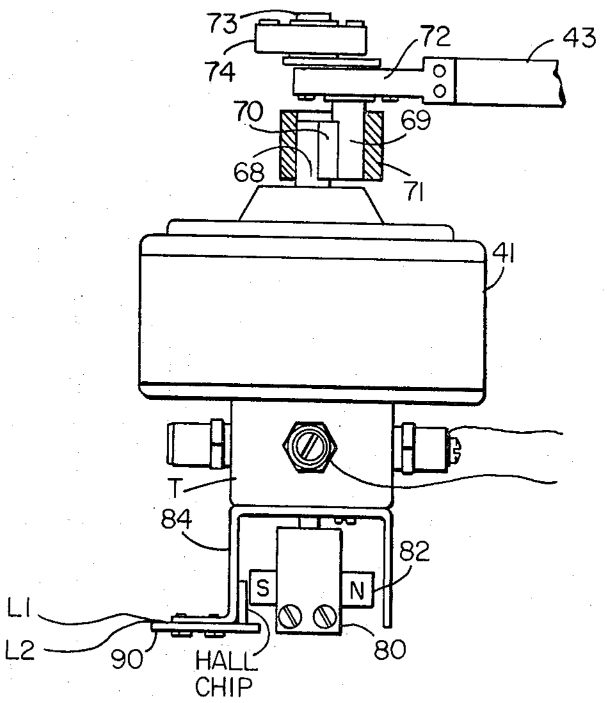
FIG. 2 is an elevational view taken on an enlarged scale showing a portion of the structure of FIG. 1.

As previously referred to, the eccentric coupling 44 serves to provide reciprocation motion to the picker mechanism 38 and the pusher mechanism 39 through the flexure drive springs 42 and 43. Referring now to FIG. 2, the drive motor 41 has a shaft 68 extending from the motor housing to which the eccentric coupling 44 is attached. The eccentric coupling 44 comprises a crank shaft 69 attached to the shaft 68 by a key 70 and a sleeve 71. A ring 72 supported by a suitable bearing is mounted for rotation on the shaft 69. The shaft 69 has an eccentric portion 73 on which is mounted a second ring 74, the ring 72 being fixed to the flexure drive spring 43, and the ring 74 being fixedly attached to the flexure drive spring 42, as best shown in FIG. 1. From the foregoing it will be evident that during operation of the motor 41, the shaft 69 is rotated through a complete revolution about the shaft 68, causing the ring 72 to move from the position shown in FIG. 2 to a position wherein the shaft 69 is on the opposite side of the shaft 68, moving the drive spring 43 to the left and back to the position. In like fashion, the rotation of the shaft 68 through an angle of 90° will be effective to move the shaft 69 to a point behind the shaft 68 (as shown in FIG. 2) moving the eccentric portion on the ring 74 rearwardly. Further rotation of the shaft 68 through 180° is effective to cause the shaft 69 to be located directly in front of the shaft 68 moving the ring 64 in the forward direction and causing reciprocating motion of the drive spring 42.

The structure as substantially described thus far is disclosed in the aforementioned co-pending U.S. application of Bower et al. While the present invention may be used in any application where a motor is to be operated under a controlled velocity through a single revolution, it is herein described in conjunction with the card feed apparatus, as shown to demonstrate a particular application wherein the invention is advantageously employed, and where the various features of the invention provide a novel card feeder apparatus of simplified construction.

Figure 3:
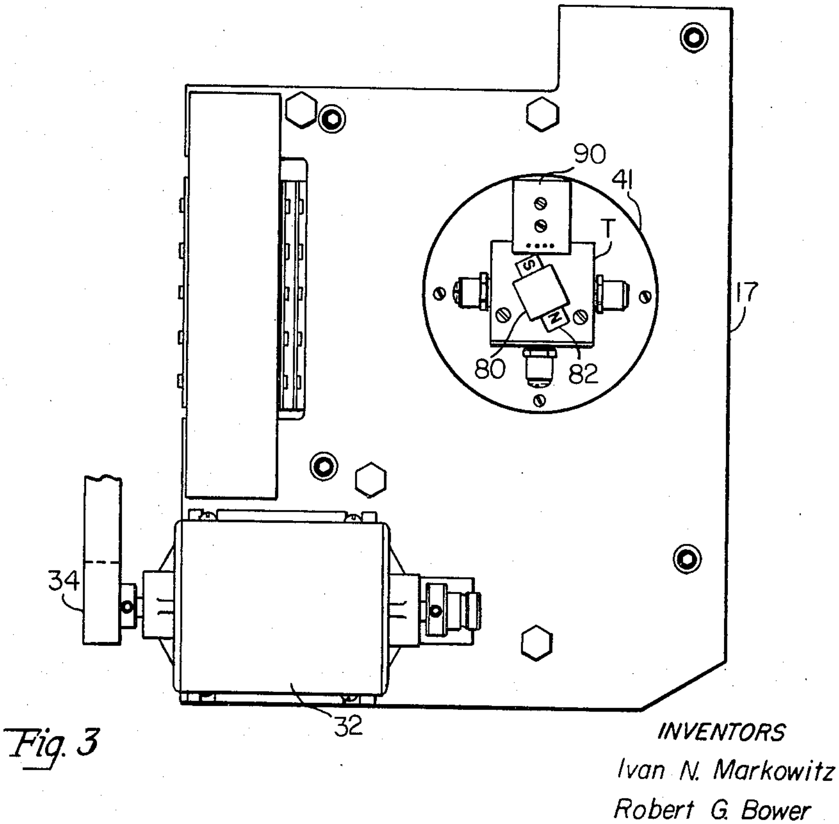
FIG. 3 is a bottom plan view showing details of the card feeding apparatus of FIG. 1, and in particular that portion shown in FIG. 2.
Figure 5:
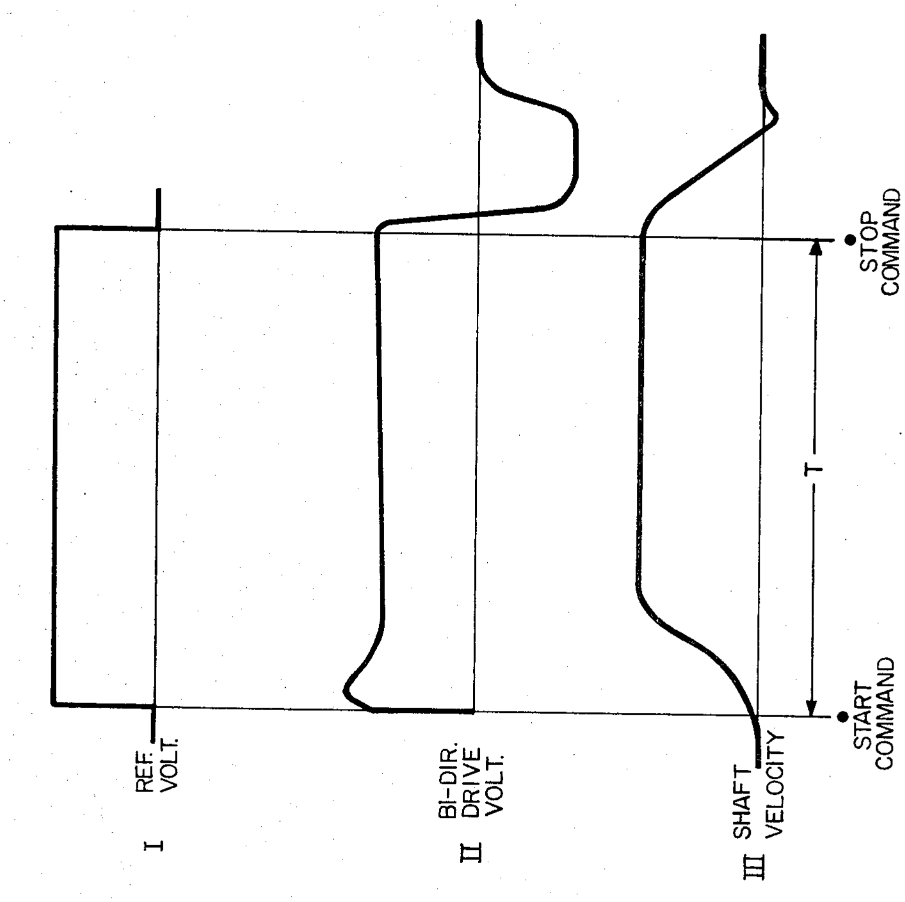
FIG. 5 is a diagram depicting voltage and velocity changes during a typical cycle of operation of the embodiment.
Figure 4:
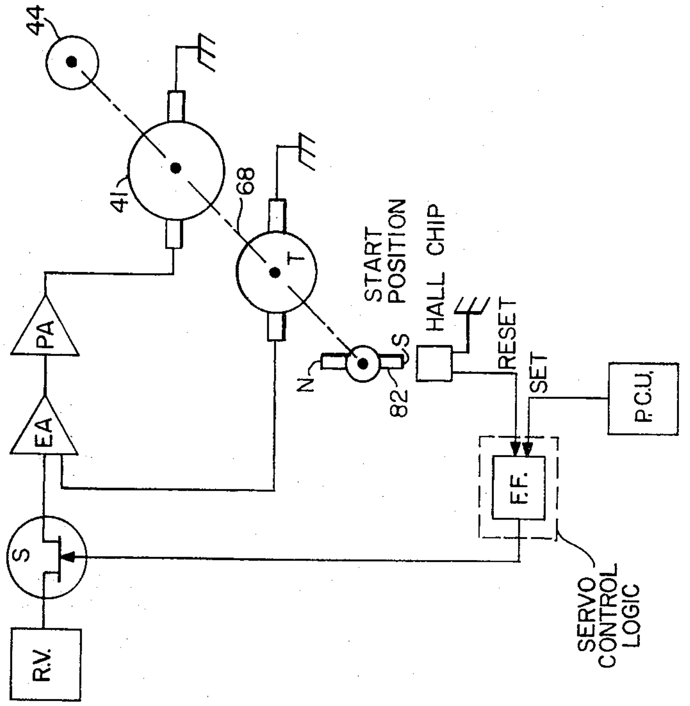
FIG. 4 is a schematic view showing basic elements of the embodiments and related circuitry in block diagram form.

Referring now to FIGS. 2 and 3 taken in conjunction with FIGS. 4 and 5, it will be noted that the DC servo motor 41 is provided with an electronic tachometer T which is effective to produce an EMF proportional to the velocity of the servo motor shaft 68. Additionally, the shaft 68 is provided with a block 80 which serves to hold a bar magnet 82 having a north pole and a south pole S located as shown. A bracket 84 is attached to the lower surface of the tachometer T and serves to support a "Hall effect" device, in spaced relation with the magnet 32. The Hall effect device is generally a semiconductor chip having Hall electrodes and is employed as a position sensor in the present arrangement. The Hall effect device herein depicted is in the form of a "Hall chip" of the type which may be purchased from Honeywell Microswitch Division, Freeport, Illinois under part No. 1SS1.

Referring to FIG. 4, it will be observed that the Hall chip is connected to a servo control logic circuit which is effective to gate a signal generated from the peripheral control unit PCU indicating that a card is called for by a read command issued at the central processor. Both the PCU and the servo control logic are not described here in detail as it is considered that a person well skilled in the art would be capable of implementing these devices from information and data obtainable within the state of the art. However, the servo control logic will be understood to comprise a flip-flop having an input from the PCU and an input from the Hall chip to provide a suitable signal to the servo loop.

Referring still to FIG. 4, taken in conjunction with FIGS. 2 and 3, it will further be observed that the shaft 68 of the motor 41 while rotating the eccentric coupling 44 is positioned to be sensed by the tachometer T. Both the motor 41 and the tachometer T have one lead extending to ground and the second lead connected into the servo control loop. While the tachometer T may be of any type well known in the art which is effective to transfer velocity information in the form of a generated EMF, the motor employed for the present application is a DC servo motor commonly referred to as a Honeywell shell motor which may be purchased from the Honeywell Microswitch Division, Freeport, Illinois under part No. HSM30.

In general, in the present application a requirement exists to provide a single revolution to the shaft 68 and the coupling 44 at a constant speed independent of the card deck load. In choosing the above motor, the requirements were that the motor be reliable, low cost and have fast start and stop capabilities. In addition, the motor was provided with the velocity servo loop which is effective to maintain constant velocity. This servo loop is shown in FIG. 4 and will be described hereinbelow in greater detail.

Referring to FIG. 6, in addition to the DC servo motor 41 as previously described, and the tachometer T which is coupled with the motor to produce an EMF proportional to the rotational velocity of he servo motor shaft 68, there is shown an error amplifier EA connected to the EMF output of the tachometer. The second lead of the error amplifier EA is connected through a field effect transistor (FET) switch S to a reference velocity voltage RV. The switch S has a position of zero velocity which is zero voltage, and a position of maximum velocity which is the reference voltage, R.V. The FET switch S is activated through the servo control logic which is connected to the peripheral control unit PCU and to the Hall effect element or Hall chip which has been previously identified above.

In the mechanical aspect of operation, with the magnet 66 serving to detent the pusher arm 59 in the position shown in dot-dash lines in FIG. 1, the picker knives, 46, 47 are in their fully extended forwardmost position, and the card feeding apparatus 10 is in the ready state. After a deck of cards has been loaded into hopper 12, the motor 32 is energized and continuous operation of the pinch roll assemblies 18 and 19 takes place. It is generally required that manual means be provided to jog the first or bottom most card from the deck causing the motor 41 to operate for a single revolution. This feature may be incorporated into the system, and the single card fed from the bottom of the deck to the waiting station 14, at which time the operator may view the card, and read the information contained thereon. With the card located at the wait station 14, and the elements positioned as above, the card feeding apparatus 10 is ready for a read command from the central processor to the peripheral control unit PCU. On receiving a command, the motor 41 is energized by rotation of the shaft 68 the pusher arm 60 moves to push the card disposed in the wait station 14 into the pinch roll assembly 18. The pinch roll assembly 18 is in continuous operation and serves to forward the card along its path to the processing station 13.

During the above operation, the picker mechanism 38 has moved beneath the card hopper 12 such that the picker blades are moved from beneath the deck of cards, and have their edges located adjacent the bottom card in the deck. A further rotation of the shaft 69 is effective to cause the edge of each blade to contact the edge of the lowermost card and move it into the pinch roll assembly 19, while simultaneously, the arm 50 is being moved towards the magnet 66. The timed sequence of pick and push operations set up by the eccentric coupling 44 is such that the roll assembly 18 is operative to carry the card pushed from the wait station 14 into the operating station 13, prior to the feeding of a new card from the stack to the waiting station by operation of the roll assembly 19. The arm 59 is attracted by the force of the magnet 66, and is stopped a few thousandths of an inch from the magnet at the end of each cycle of operation. The arm 59 is thereby effective to position the shaft 68 at a precise position due to its connection to the shaft. Thus, at the initiation of a read signal given by the central processor, the arm 59 and picker blades 57 and 58 retain a timed relation for the pick and push operation, which is the same from one card to another as the cards are being fed into the processing station 13. While the magnet 66 is shown as acting on the shaft 68 through the arm 59, it should be apparent that the magnet detent could be located adjacent the points, on the structure, or the shaft itself to produce the desired detent effect.

Referring now to FIGS. 4 and 5, in operation of the above-described device a start command is issued from the peripheral control unit to the servo control logic, indicating that the peripheral control unit is calling for a card to be read, which is common to such card reading devices as the type described. The FET switch S is at the zero velocity or zero voltage position and the motor shaft 68 is at zero velocity position, at rest, being operated on by the magnet 66. When the command signal is directed to the servo control logic, the flip-flop is set and the FET switch S is actuated to connect the reference velocity RV into the servo loop. The reference velocity voltage provides an error signal to the error amplifier EA due to a zero velocity being indicated by the tachometer T having an output connected to the error amplifier EA. The power amplifier PA which operates as a servo driver is fed a fixed voltage which is initially the reference voltage R.V. As the servo motor 41 gains speed, and the shaft velocity increases, the tachometer T is effective to feed back the velocity information in the form of an EMF to the error amplifier EA and the voltage to the servo driver PA will stabilize at the reference voltage. The DC servo motor 41 then operates at a constant velocity which is determined by the EMF at the reference voltage RV which in the present embodiment is between 1 and 2 volts. The motor will continue operating at the constant voltage, and thus a constant velocity, until a stop command is fed to the servo control logic flip-flop.

As the north pole of the magnet approaches the Hall chip near the end of a single revolution, the Hall chip senses the magnetic element approaching and a signal is generated by the Hall chip which is directed to the servo control logic which is effective to reset the flip-flop to switch the FET switch S to the zero voltage, or zero velocity position by removing the reference voltage R.V. from the loop. The error amplifier EA now senses that the velocity or voltage generated by the tachometer T is greater than the reference velocity voltage being called for. The error amplifier EA sensing that the voltage output from the tachometer T is greater than a line voltage in that portion of loop, the FET switch S will generate a signal to the power amplifier PA to reverse the current to the motor 41 and exert a driving force on the motor in the opposite direction. This reversal of current to the motor 41 acts to rapidly overcome the inertia of the servo motor and cause rapid deceleration to bring it to a more sudden stop. Additionally, the magnet 66 serves to act on the motor shaft 68 through the pusher arm 59 to precisely fix the position of the shaft in the stopped position.

Referring now to FIG. 5 there is shown in diagrammatic form the reference voltage, the bidirectional drive voltage, and the shaft velocity depicted from the start command, through a single revolution of the shaft 68 to the point at which the Hall chip is influenced by the flux generated by the magnet 82 to produce a stop signal at the FET switch S. Referring to 5–I it will be noted that with the start command, the reference voltage is zero and immediately goes to a maximum of from 1 to 2 volts which is sustained until the stop command is received, at which time the FET switch S is effective to bring the reference voltage in the loop to zero. The bidirectional drive voltage, as depicted in FIG. 5–II, however, is acted on by a large error voltage which produces a build-up to a peak voltage as shown leveling off at the running speed voltage which is a product of the reference voltage and the EMF generated by the tachometer. With the generating of the stop command, the reference voltage removed from the loop, and the power amplifier PA is effective to reverse the drive voltage to the motor 41. The voltage being impressed on the motor 41 tends to drive the motor in the opposite direction to effectively brake the motor produces the shaft velocity shown in FIG. 5–III. The peak in voltage at the beginning of the curve in FIG. 5–II is caused by the large error voltage due to the detent effect of the magnet 66 acting to prevent rotation of the shaft 68. In the curve depicted in FIG. 5–III the shaft velocity begins at zero and increases to a constant velocity until the stop command is received. At this point in time the shaft velocity returns to zero, however, there may be a small reverse drive velocity as shown in the curve which is caused by the bidirectional drive of the velocity servo driver PA. Although the shaft velocity is zero shortly after the stop command, the precise point at which the shaft 68 is located is generally within 2° or 3° of that required for precise cycling of the motor. The magnetic detent 66 acting on the system serves to precisely locate the shaft after the velocity is brought to zero.

Both the Hall effect, and Hall effect devices or Hall generators, are known in the art, therefore it will merely be stated that in general the Hall effect device comprises a pair of electrodes which generate a voltage pulse when subjected to a magnetic field. The Hall effect device described above is a semiconductor chip mounted on a sheet 90 and interconnected to the servo loop through lead wires $L_1$ $L_2$ (FIG. 2). The chip carries an electrode current in the longitudinal, or vertical (FIG. 2) direction and is subject to a magnetic field in a direction normal to the sheet 90. An EMF which is at right angles to both the current direction and the magnetic field results when the magnet 82 is rotated by the shaft 68 such that the Hall electrodes are placed in the magnetic field. A potential is generated which is a function of the vector product of the magnetic intensity and the current density, therefore, the greatest potential occurs when the proper pole of the magnet B2 is nearest the Hall sensing device. An output signal which is delivered to the servo control flip-flop which is reset and effective to open switch S to disengage the reference voltage RV from the servo loop.

The application of the single revolution servo loop to the card reader mechanism and its advantages will be described with reference to FIG. 1, wherein the picker and pusher devices 38 and 39 are shown in their relaxed position. Prior to the initiation of a cycle, the detent magnet 68 however, is holding the pusher member in the flexed position, and the picker arms 46 and 47 are extended forward to their flexed position. As explained above, when a signal is received from the peripheral control logic unit PCU indicating that a card is to be fed to the read station, the servo control logic switches, the FET switch S and the error amplifier EA receives a reference voltage which is relayed to the velocity servo driver PA starting operation of the motor 41. As soon as the motor 41 reaches its full speed, the crank system 44 starts to rotate. The system may rotate either clockwise or counter clockwise. However, for the purpose of the present description, it will be assumed that the system rotates counter clockwise. As the system starts to move, the arm 59 moves to the left and the picker knives 46 and 47 move rearwardly. As the motor turns, a voltage is generated by the tachometer T which indicates that the velocity of the motor is increasing. A voltage proportional to that velocity is fed back to the error amplifier EA, and the error voltage is then that voltage which is necessary to maintain the motor at a constant velocity, which is proportional to the reference velocity voltage being fed into the error amplifier. The crank mechanism 44 continues to rotate in a sinusoidal motion which is inherent in the crank design. That is , both the picker knives 46 and 47 and the pusher arm 59 start at zero velocity reach a maximum velocity half way through their travel. As each of the elements (the arm 59 and the picker knives 46, 47) reach the end of their travel, the velocity of each element again approaches zero. The picker knives strike the card at zero velocity and the pusher arm engages the card at zero velocity to thereby prevent damage to the cards by either of the picker or pusher elements. Likewise, the velocity of the arm 59 approaches zero as the card is being fed into the rolls 18 and any buckling which might be produced by pushing the cards between the rolls at a greater velocity than the rolls are moving is eliminated. As the picker knives 46 and 47 reach their full forward position and the arm 59 again approaches the magnet 66, the south pole S of the magnet element 82 approaches the Hall chip and indicates that the motor is to be stopped. With the south pole element S of the magnet in the area of the Hall chip, a command is issued to the servo control logic as described above and the FET switch returns the loop to the zero velocity, or zero reference voltage position.

Thus, it can be appreciated that the present invention provides a simple servo loop which is effective to control the picker and pusher elements of a card feed arrangement through a single revolution of a motor. The simple Hall chip and magnets arrangement in combination with a positive detent is effective to precisely control the start and stop position of the motor increase the effectiveness of the loop where precision is required in locating the elements driven by the motor.

What is claimed is:

1. A single revolution crank system comprising in combination a direct current motor having an output shaft and an electrical network for operating said motor to turn said shaft through a single revolution, said network comprising switch means for introducing a fixed value reference EMF into said network to initiate operation of said motor when in a first state, and means for sensing the completion of a single revolution of said motor shaft and interconnected to said switch means for moving said switch means to a second state wherein the EMF is removed from said network after a single revolution of said motor shaft.

2. The crank system of claim 1 wherein said sensing means is a Hall effect device comprising a pair of Hall electrodes.

3. The crank system of claim 1 wherein said shaft is provided with a bar magnet having its poles extending radially outwardly from said shaft and adjacent said Hall effect device.

4. The crank system of claim 3 which further includes magnetic detent means operatively associated with said system for maintaining said shaft at a precise stop and start location.

5. A single revolution crank system comprising in combination; a direct current motor having an output shaft and an electrical network for providing electrical energy to said motor to turn said shaft through a single revolution, said shaft having means for generating a magnetic flux disposed thereon for rotation by said shaft, said network comprising a Hall effect device for sensing the magnetic flux generated by said generating means and generating a signal on sensing the magnetic flux, signal storage means having one input connected to said Hall effect device for receiving said signal and another input connected to a control unit for receiving an electrical pulse from said unit, a switching device operatively connected to an output terminal of said storage means and operable in response to an output signal from said storage means, a fixed value reference voltage source connected to said motor through said switching device, said storage means operating to provide a signal to said switching device to close the circuit between said voltage source and said motor on receiving a signal from said control unit and to provide a signal to said switching device to open said circuit between said voltage source and said motor on receiving a signal from said Hall effect device.

6. The crank system of claim 5 which further includes detent means external of said network for maintaining said shaft at a precise stop and start position with said flux generating means adjacent said Hall effect device.

7. The crank system of claim 5 wherein said storage means is a logic flip-flop element.

8. The crank system of claim 5 wherein said network further includes means connected between said switching device and said motor for receiving said reference voltage signal and another voltage signal and comparing the two for applying a voltage to said motor which is effective to induce rotation in said shaft when said reference voltage is on and said second voltage is off and to induce counter-rotation in said shaft when said reference voltage is off and said second voltage is on, and means for generating said second voltage in response to rotation of said shaft.

* * * * *

UNITED STATES PATENT OFFICE
CERTIFICATE OF CORRECTION

Patent No. 3,668,496 Dated June 6, 1972

Inventor(s) Ivan N. Markowitz et al

It is certified that error appears in the above-identified patent and that said Letters Patent are hereby corrected as shown below:

Column 8, line 10, "1" should read -- 2 --.

Signed and sealed this 12th day of December 1972.

(SEAL)
Attest:

EDWARD M.FLETCHER,JR.
Attesting Officer

ROBERT GOTTSCHALK
Commissioner of Patents